United States Patent [19]

Francis

[11] Patent Number: 4,856,816
[45] Date of Patent: Aug. 15, 1989

[54] METHOD AND MEANS FOR RELEASABLE ATTACHMENT OF MUD FLAP ON VEHICLE

[76] Inventor: Timothy M. Francis, 175 Burning Tree Dr., San Jose, Calif. 95119

[21] Appl. No.: 174,119

[22] Filed: Mar. 28, 1988

[51] Int. Cl.⁴ .............................................. B62B 9/16
[52] U.S. Cl. ........................................ 280/851; 403/2; 403/290
[58] Field of Search .................... 280/154.5 R; 403/2, 403/289, 290

[56] References Cited

U.S. PATENT DOCUMENTS 1,904,343  4/1933  Zaiger et al. ................ 280/154.5 R
3,726,544  4/1973  Miller ........................... 280/154.5 R

FOREIGN PATENT DOCUMENTS 493696  6/1950  Belgium .
484327  6/1952  Canada ............................... 403/289
960725  1/1975  Canada ......................... 280/154.5 R
604068  6/1948  United Kingdom .
321968  10/1934 Italy .

*Primary Examiner*—Charles A. Marmor
*Assistant Examiner*—Eric Culbreth
*Attorney, Agent, or Firm*—John J. Leavitt

[57] ABSTRACT

Presented is a method and a device for releasably securing mud flaps to a vehicle. The method involves attachment of the mud flaps in such a way that upon the application of a predetermined downwardly exerted force on the mud flap, it will be released without damage to the flap, or its hanger bracket, thus enabling its retrieval and replacement. Structurally, the hanger bracket includes a metal socket fastened to the vehicle, and an elastically deformable insert which normally lies enclosed within the socket when supporting the flap, but which is elastically deformed and pulled through the socket when an extraordinary force is imposed on the flap.

12 Claims, 1 Drawing Sheet

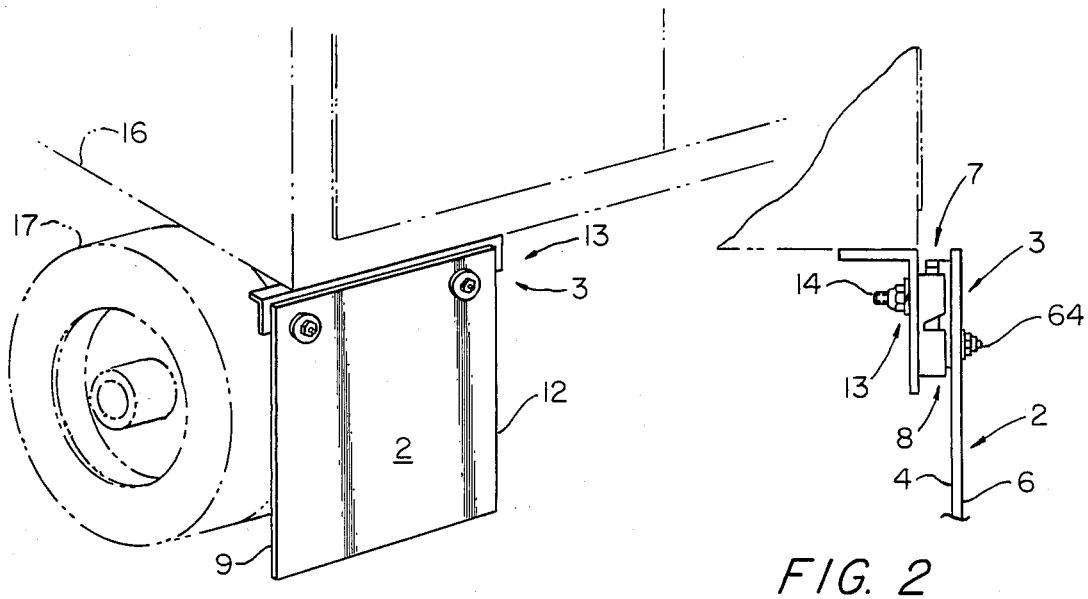
FIG. 1
FIG. 2
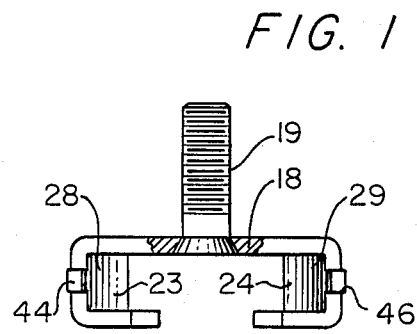
FIG. 3
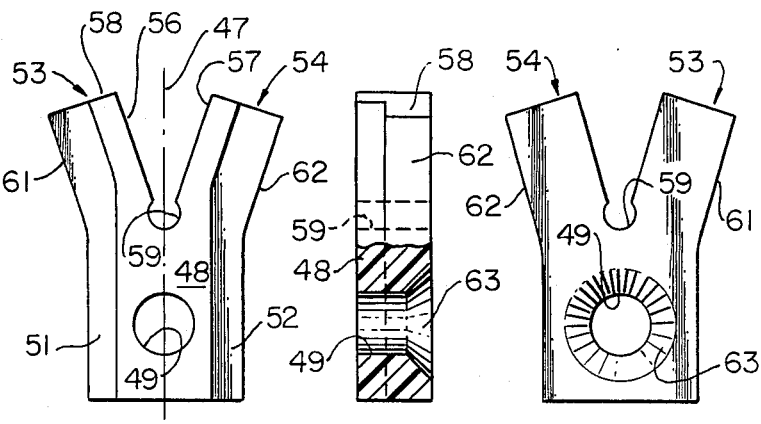
FIG. 6  FIG. 7  FIG. 8
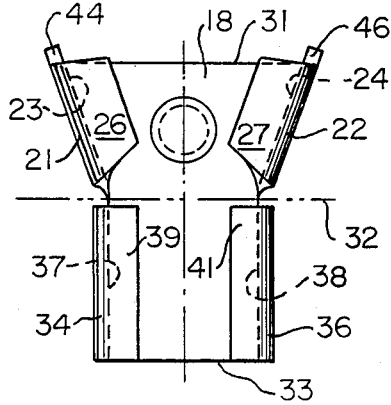
FIG. 4
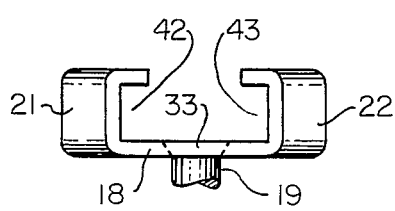
FIG. 5
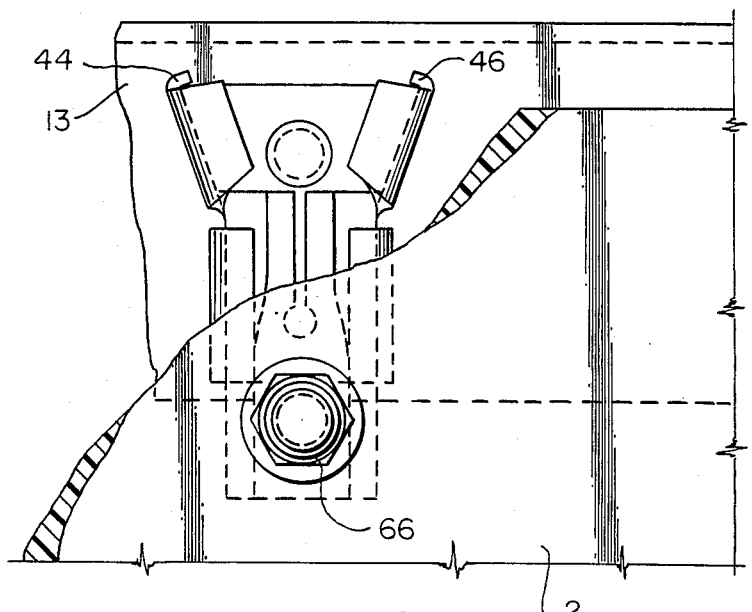
FIG. 9

METHOD AND MEANS FOR RELEASABLE ATTACHMENT OF MUD FLAP ON VEHICLE

BACKGROUND OF THE INVENTION

1. Field of the Invention.

This invention relates to so-called mud or splash guard flaps of the type that are supported behind the rear wheels of trucks; and more particularly to a method and means for suspending such mud flaps in a way that permits them to be released from the vehicle without damage upon the application of an inordinate amount of force to the mud flap structure, thus enabling replacement of the same mud flap on the supporting bracket.

2. Description of the Prior Art.

A preliminary patentability and novelty search relating to this invention revealed the existence of the following U.S. Pat. Nos.: 938,057, 1,494,871, 2,059,869, 2,106,992, 2,139,307, 2,533,974, 2,619,363, 2,683,612, 2,714,015, 2,755,484, 2,777,710, 2,865,655, 2,935,336, 3,027,178, 3,051,508, 3,095,215, 3,158,386, 3,198,545, 3,219,363, 3,224,791, 3,248,126, 3,285,624, 3,333,868, 3,700,260, 3,778,086.

Among the foreign patents found that relate to mud flaps for vehicles was Belgian Pat. No. 493,696; British Pat. No. 604,068 and Italian Pat. No. 321968.

Referring to each of the patents in the order in which they were issued, U.S. Pat. No. 938,057 relates to a binder for binding loose sheets into a book form and includes one or two bars lying in close parallel juxtaposition, one of the bars being pivoted in relation to the other, and the other said bar having a pivoted catch mechanism adapted to overlap the bars when placed in a binding relationship on a pack of stacked sheets. While this patent discloses a binding device, it has no relevance whatever to mud flaps and vehicles.

U.S. Pat. No. 1,497,871 also relates to a support structure, but this device utilizes a spring clip to frictionally support a hat, such as might be required within a vehicle, cooperating with an extension of the clip to support a coat, or jacket. Again, the only relevance of this invention to a vehicle is that it may be mounted within the interior of a vehicle to support the hat and coat of an occupant of the vehicle.

U.S. Pat. No. 2,059,869 relates to an antenna structure for an automobile, the antenna structure being associated with the mud flaps which are permanently attached to the running boards of the automobile or to the fenders thereof. There is nothing in this patent that suggests the releasability of the mud flaps from their supporting structure upon the imposition of an inordinate amount of a downwardly directed force.

U.S. Pat. No. 2,106,992 relates specifically to a splash guard for a motor vehicle, the splash guard being adapted to be secured permanently to the beaded lower edge of the vehicle fender.

U.S. Pat. No. 2,139,307 relates to a splash guard design particularly for application to the lower end of a bicycle or motorcycle fender and to a specific clamp structure for suitably and permanently effecting such attachment. There is nothing in this structure that suggests the desirability of mounting the splash guard in such a way that it will pull free from the fender without damage.

U.S. Pat. No. 2,533,974 relates to a support clamp of the type that might be utilized to support a cup or water glass or flower pot on a cylindrical support structure, such as a pipe. There is nothing in this patent that suggests the utilization of a support clamp for releasably securing mud flaps to a motor vehicle upon the application of an inordinate downwardly directed force.

U.S. Pat. No. 2,619,363 relates specifically to a vehicle splash guard, but this patent teaches only the permanent attachment of the splash guard to the truck, and the thrust of the invention relates to the passage of air through the mud flap to minimize the tendency of the mud flap to be displaced rearwardly when the truck is in motion.

U.S. Pat. No. 2,683,612 also relates specifically to a mud flap for vehicles, and this patent appears to be the first of the group that incorporates the quality of detachability of the mud flap from the vehicle, as distinguished from releasability of the mud flap upon the application of an extraordinary force on the flap in a downward direction. However, detachability is effected by a releasable spring latch and lateral translation of the mud flap to withdraw the T-shaped upper edge thereof from the channel within which it is contained.

U.S. Pat. No. 2,714,015 relates specifically to a splash guard for attachment to the rear of vehicles, but does not specify the manner of attachment of the mud flap. The thrust of this construction is to deflect to the center of the mud flap any mud or slush that might be thrown by the rear wheels.

U.S. Pat. No. 2,755,484 relates merely to a fitting of a type that is used for holding a flexible liner to the inside of a tank. There is nothing about this fitting that suggests its use in connection with a mud flap for vehicles.

U.S. Pat. No. 2,777,710 relates specifically to a detachable splash guard for trucks and trailers, the detachability of the splash guard being intentional rather than inadvertent as proposed by the instant invention. In this construction, the upper edge of the flap is provided with an enlarged thickness that is accommodated in a channel that prevents vertical displacement of the flap. Lateral translation of the flap in the channel is prevented by cotter pins extending through the channel outboard of the lateral edges of the flap.

U.S. Pat. No. 2,865,655 is directed to a wheel flap that is particularly useful for use in conjunction with logging trucks that travel over relatively unimproved roads. In this construction, the lateral arm or beam on which the mud flap is permanently secured is itself resiliently retained to the vehicle frame so that the entire supporting beam may be quickly detached from the frame to remove the flaps, or which will be pulled free from the frame if the beam comes into contact with an obstruction.

U.S. Pat. No. 2,935,336 relates to mud guards that are removable and quickly attachable to the mounting structure, the latter comprising an elongated sleeve welded to the underside of the frame adjacent its rear end, with each of the mud flaps being secured to a tube adapted to telescope into the associated end of the sleeve. To retract the flaps, a pin is removed from the tube retaining the flap, and spring means within the sleeve pull the tube into the sleeve. To extend the flaps into position of use, the tube is pulled from the sleeve, and the pin reinserted to retain the flap structure in extended position. There is nothing about this structure that suggests the release of the flap when the flap is inadvertently caught under the rear wheels or against an obstruction.

U.S. Pat. No. 3,027,178 relates to a splash guard for trucks, but does not teach the concept of detachability of the mud flap or of purposeful release of the mud flap in the event that the mud flap gets caught underneath the rear wheel or against an obstruction. This splash guard is permanently attached to the vehicle.

U.S. Pat. No. 3,051,508 is directed to a vehicle splash guard that is permanently attached to the vehicle, but which incorporates a lower transverse section that is adapted to pull free from the main flap portion if the lower transverse portion is caught between a rear wheel and an obstruction.

U.S. Pat. No. 3,095,215 teaches a splash guard that introduces the concept of reusability of the splash guard after a portion thereof has been torn free from the splash guard by an unexpected encounter with an obstruction. If the flap is recovered after being torn from the vehicle, the torn away portion is removed from the supporting structure and the flap again suspended in the usual manner. There is nothing in this patent that suggests the pulling free of the mud flap from the supporting structure without the destruction or tearing of the flap.

U.S. Pat. No. 3,158,386 is of particular relevance in that it discloses a mud flap or splash guard for a truck that embodies the concept of releasability of the mud flap from its supporting structure upon the imposition of a downwardly directed tensile force. However, the structure utilized to effect this result is completely different from the structure of the instant invention.

U.S. Pat. No. 3,198,545, while it relates to a spray shield or splash guard for attachment to the underside of a vehicle, such as a truck, to shield following vehicles from mud or debris flung from the wheels, does not incorporate structure that purposefully permits release of the splash guard structure when a predetermined amount of downwardly imposed force is applied on the splash guard.

U.S. Pat. No. 3,219,363 constitutes another relevant patent in that this patent also teaches the concept of releasable attachment for the mud flap that permits release of the mud flap without destroying the mud flap when a predetermined amount of downwardly exterted force is imposed on the mud flap, such as when the mud flap might be caught between the rear wheels and an obstruction such as a stop block. A retention means in this construction includes a thickened bead at the upper edge of the mud flap that is retained in a complimentary configured angle that is spring-pressed to normally retain the flap suspended from the vehicle. However, when a predetermined downwardly directed force is imposed on the mud flap, the thickened edge portion of the flap functions as a cam to rotate the clamp means into a position wherein the flap is released from its attachment. Obviously, while achieving the same purpose as the present invention, it accomplishes that purpose by a wholly different means.

U.S. Pat. No. 3,224,791 is directed to the mounting structure for a splash guard, the invention residing in the nature of the structure from which the splash guard is suspended, this being resiliently suspended for lateral translation in relation to the vehicle. The mud flap itself is permanently attached to the flap mounting means.

U.S. Pat. No. 3,248,126 relates to a retractable assembly for mud flaps that are mounted on the rear end of a dump truck. Since a load that is dumped may bury the mud flap and thus cause it to be trapped so that when the truck pulls away from the dumped load, the flaps are torn from their mounting brackets, it is advisable to retract the mud flaps before the load is dumped, thus eliminating the possibility of losing the mud flaps.

U.S. Pat. No. 3,285,624 relates to a splash guard and mounting assembly therefor that results in the permanent attachment of a splash guard to the mounting assembly. There is nothing in this patent that suggests the releasability of the splash guard upon the imposition of a downwardly directed force of extraordinary and inordinate amount.

U.S. Pat. No. 3,333,868 teaches the mounting of a mud flap or splash guard on a fixed bracket on a truck in such a manner that the flap may be pulled free from its mounting, but remains tethered to the mounting by an appropriate structure so that the flap is not lost when it is released. The flaps are retained in operative position by resilient metallic spring clips having appropriate projections that penetrate apertures in the upper edge of the mud flap to retain the mud flap in operative position.

U.S. Pat. No. 3,700,260 is directed to a mud flap and a mounting means therefor in which the upper edge of the mud flap is enlarged and retained in a spring pressed clamp that releases when a predetermined amount of downwardly directed stress is imposed on the depending portion of the mud flap. When this occurs, the clamp means opens and the flap is released.

U.S. Pat. No. 3,778,086 also relates to a mud flap that is releasably attached to a supporting structure, the releasable means including a spring pressed clamping structure that normally retains the flap in position of use, but which opens against spring pressure to release the mud flap from its mounting when an inordinate amount of downward stress is imposed on the flap.

Belgian Pat. No. 493696 also relates to a splash guard or mud flap but is directed to the means for mounting the flap in a manner to permit easy removal. Nothing in this patent teaches the automatic release of the flap from its mounting when an inordinate amount of downwardly directed force is imposed thereon.

British Pat. No. 604,068 is directed to a splash guard for cycles such as bicycles and motorcycles, and is permanently mounted on the fender, with no provision being made for release of the splash guard in the event it is tugged downwardly.

In like manner, Italian Pat. No. 321968 discloses a mud flap that is permanently attached to the bottom edge of the rear fender of an automobile, is articulated in its construction, but permanently attached with no provision being made for release of the splash guard upon the imposition of a downwardly directed force.

From the numerous patents discussed above, it will be seen that while the concept of the placement of a mud flap or a splash guard behind the rear wheels of a tractor or a trailer is an old concept, most of the structures that are illustrated in the patents discussed above relate to the specific permanent mounting of the mud flap on a permanently attached bracket, or relate to a removable bracket that permits the quick and easy removal of the flap and supporting bracket completely from the truck. Only about five of the patents, as noted above in the discussion of those patents, treat the concept of the purposeful release of the mud flap or splash guard from its mounting, without destruction of the flap, when a downwardly directed predetermined and non-destructive force is imposed on the flap. All of these structures however are different from the structure of the instant invention. Accordingly, one of the objects of the present invention is to provide a flap structure and a mounting means therefor that incorporates means for releasably mounting the flap on a vehicle in such a manner that when a downwardly directed force of predetermined amount is imposed on the flap, the flap will be automatically released from its mounting without damage or destruction of the flap.

As indicated in two of the patents discussed above, particularly U.S. Pat. Nos. 2,683,612 and 2,777,710, directed to the use of flaps on dump trucks, flaps must be removed and replaced quite frequently depending upon the service to which the truck is put. Accordingly, another object of the invention is the provision of a mounting means for truck flaps which enables the driver to quickly and easily remove and replace the flaps as needed.

A set of flaps for a dual wheeled truck or tractor can cost a substantial amount of money. The cost of these flaps, coupled with the fine that a trucker might have to pay if he is caught on a highway without the flaps, creates the temptation that these flaps be stolen from one truck and placed on another. Accordingly, a still further object of the invention is the provision of a mounting means for mud flaps on a truck constructed in such a way that the flaps may be easily removed and replaced by an authorized person, but which include means for discouraging their theft.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the splash guard or mud flap and supporting structure therefor of the invention comprises a generally rectilinear sheet of thick rubber or plastic material, perhaps even metal, the upper edge of which is attached to a vehicle requiring such equipment behind the rear wheels thereof. The mounting assembly for the mud flap or splash guard as it is sometimes called includes a downwardly depending and transversely extending horizontal bar having a length at least as wide as the wheels behind which it is mounted, and having attached adjacent each opposite end on the side thereof opposite the wheels, a bracket forming a socket. The socket is preferably fabricated from cold rolled steel, and may be either welded to the support bar or bolted thereto. The socket is adapted to slidably receive an insert which when fully inserted in the socket complements the interior configuration of the socket. Additionally, the insert is provided with a pair of bifurcated divergent arms extending from a body portion through which extends an appropriate cap screw to which is permanently attached the top edge portion of the flap. A suitable castellated nut and washer retain the flap and insert in tight interconnection. The insert may be fabricated from a suitable synthetic resinous material, a rubber like material, or even from metal, so long as the bifurcated and divergent arms are possessed of a predetermined amount of resiliency to permit the normally divergent arms to become parallel. Preferably, the insert is formed from a non-metallic monolithic body formed from a resiliently deformable material having a durometer rating of at least 60. Additionally, while a cap screw is provided mounted on the insert for attachment of the flap to the insert, it should be understood that in a broad sense, upon proper selection of materials, the insert could be vulcanized direct to the front side of the flap, so that no auxiliary means, such as a cap screw would be necessary to fasten the insert to the front side of the flap. With the insert attached to the front side of the flap, all that is necessary to mount the flap on the truck is to orient the inserts so that they are juxtaposed and above the sockets fastened to the downwardly depending bar, and then lower the flap so that the inserts slide into the socket and thus retain the flap suspended behind the rear wheels.

BRIEF DESCRIPTION OF THE DRAWINGS

FIG. 1 is a perspective view of one corner of a truck equipped with a flap according to this invention.

FIG. 2 is a fragmentary elevational view illustrating an edge view of the flap and mounting means therefor.

FIG. 3 is a plan view of the socket member in which the flap is releasably supported.

FIG. 4 is front elevational view of the socket illustrated in FIG. 3.

FIG. 5 is a bottom plan view of the socket structure illustrated in FIG. 4.

FIG. 6 is a front elevational view of the insert adapted to be attached to the front side of the flap adjacent the upper marginal edge thereof.

FIG. 7 is a right elevational view of the insert illustrated in FIG. 6.

FIG. 8 is a rear elevational view of the insert illustrated in FIGS. 6 and 7.

FIG. 9 is a fragmentary elevational view of the completed assembly shown in mounted position with the flap and insert partially withdrawn from the socket from which they are suspended.

DESCRIPTION OF THE PREFERRED EMBODIMENT

In terms of greater detail, the mud flap or splash guard of the invention, is of the type that is adapted to be mounted on a vehicle behind the rear wheels thereof, the purpose of the flap being to intercept any mud, rocks or other debris that might be thrown backwardly by the revolving rear wheels. As indicated in the patents discussed above, the concept of utilizing a mud flap or splash guard for this purpose is an old concept. However, with few exceptions, all of the structures revealed in the patents discussed above are permanently attached to the vehicle, and make no provision for the intentional release of the mud flap in the event that it gets trapped between an obstacle and the rear wheels in such a manner that continued rotation of the wheels imposes a downwardly directed force on the mud flap. Unless such a provision is made, the mud flap is usually stripped from its hanger bracket and is usually damaged beyond repair and use and therefor must be replaced. The patents discussed above that specifically treat this concept are U.S. Pat. Nos. 3,158,386, 3,219,363, 3,333,868, 3,700,260 and 3,778,086.

Many states require that specific types of vehicles traveling its highways be equipped with such flap sets. To be caught without them frequently results in the issuance of a citation in the form of a "fix it" ticket, thus requiring that the equipment be repaired or replaced, and that the citation be signed off by appropriate authority. In addition, fines are frequently imposed in addition to the requirement that the equipment be repaired or replaced.

It is therefore an advantage to have a flap constructed in such a way that it may be mounted on the vehicle so that if an inordinate amount of downwardly directed force is imposed on the flap, the flap will automatically be released from its supporting bar, and released in such a manner that it is not damaged and may be recovered and reapplied to the same support to which it was originally mounted.

To accomplish this purpose, I have provided a combination of novel elements cooperating in such a way that the flap is not only normally secured to the vehicle in operating position, but is supported in such a manner that if an inordinate amount of downwardly directed force is imposed on the flap, the flap will be released from its mounting without damaging the flap or the means by which it is suspended. This is accomplished by providing a flap designated generally by the numeral 2 and constituting a generally rectangular sheet of flexible material such as synthetic resin material or rubber-like material, having an upper edge portion designated generally by the numeral 3 and constituting the mounting portion of the flap. Each flap is provided with a front surface 4 and a rear surface 6 and there is mounted on the front surface 4, associated with the mounting edge portion 3, an insert designated generally by the numeral 7, cooperating with a socket member designated generally by the numeral 8 and adapted to be attached to the vehicle. As indicated in FIG. 1, two such inserts and sockets are provided adjacent lateral edges 9 and 12 of the flap. Each of the sockets 8 is secured to a suspension structure designated generally by the numeral 13 by an appropriate cap screw 14. As illustrated in FIGS. 1, 2 and 9, the flap 2 is mounted on a vehicle designated generally by the numeral 16, the vehicle being equipped with rear wheels designated generally by the numeral 17, and the flap 2 being suspended from the vehicle in such manner that it drapes behind the wheels 17 a prescribed distance and to within approximately 8 inches of the surface on which the wheel is supported.

Referring to FIGS. 3, 4 and 5, it will there be seen that the socket designated generally by the numeral 8 is fabricated preferably from cold-rolled steel plate having a thickness of approximately 3/32" and formed to provide a rear plate portion 18 to which is welded a threaded stud 19. The plate portion 18 is integral with a pair of convergent side wall members 21 and 22, the side member 21 providing a sloping wall surface 23, while the side member 22 provides a downwardly sloping wall surface 24 as shown. Integral with the side member 21 is a flange 26, while integral with the side member 22 is a flange 27. The flange 26 and 27, as shown in FIG. 4, are mutually extending, cooperating with the associated side members 21 and 22 and the back plate 18 to form convergent channels 28 and 29 that extend from the top edge 31 of the back plate 18 to near a median plane 32 that approximately bisects the back plate 18 between its top edge 31 and its bottom edge 33. It should be noted that the stud 19 is welded to the back plate in the area above the plane 32, being positioned approximately midway between the plane 32 and the top edge 31, and symmetrically with respect to the converging channels 28 and 29. Below the plane 32, the back plate 18 has a generally rectangular configuration, and is provided with lateral side members 34 and 36 formed integrally on the lateral side edges of the back plate below the plane 32, so as to provide parallel wall surfaces 37 and 38 as shown. Additionally, the side members 34 and 36 are formed integrally with mutually reaching flanges 39 and 41 which cooperate with the side members 34 and 36 and that portion of the back plate below the plane 32 to form two parallel channels 42 and 43 for a purpose which will hereinafter be explained.

Referring to FIGS. 3 and 4, it will there be seen that the side wall members 21 and 22, at their upper ends, are provided, respectively, with lugs 44 and 46 which extend from the side wall members 21 and 22 in the same plane therewith.

The socket 8 thus described, is mounted by means of the threaded stud 19 on the mounting bar 13 as illustrated in FIGS. 1, 2 and 9. When mounted, it will be see that the socket 8 is retained fixed to the bar 13 by an appropriate nut threaded on the stud 19. As indicated above, two such sockets are provided, one each adjacent the opposite ends of the bar 13. As illustrated in FIGS. 1 and 2, the bar 13 is conveniently an angle bar, the upper flange of which is bolted or welded to the vehicle in any secure manner.

The insert designated generally by the numeral 7 is illustrated in detail in FIGS. 6, 7 and 8. As illustrated in these views, the insert comprises a monolithic body symmetrical with respect to a median plane 47, and includes a main body portion 48 provided with an aperture 49 and rabbetted along its lateral edges to provide laterally extending flanges 51 and 52 as shown. At its upper end, the insert is bifurcated to provide a cleavage that separate a pair of compression members designated generally by the numerals 53 and 54, each of the compression members including a portion of the main body portion 48 and the associated flange 51 or 52. The compression members 53 and 54 are provided with inner surfaces 56 and 57 which extend from the top ends 58 to an aperture 59 formed through the main body portion 48. As illustrated, the bifurcated compression members 53 and 54 diverge outwardly from the aperture 59, the laterally extending flanges 51 and 52 having convergent side surfaces 61 and 62. As shown in FIG. 7, the aperture 49 is chamfered as at 63 to receive and to retain in a recessed manner the head of a retention cap screw 64. The cap screw 64 extends through the aperture 49, and projects sufficiently from the face of the insert main body portion to receive the thickness of the flap 2, the treaded end portion of the cap screw 64 projecting through an appropriate aperture in the flap, to which the main body portion 48 of the insert is clamped by an appropriate nut 66. It is within the contemplation of this invention that the insert be vulcanized, when appropriate, to the face of the flap, thus dispensing with the need for the cap screw 64.

If the insert as illustrated in FIG. 6 is now compared with the socket illustrated in FIG. 4, it will be seen that the insert 7 is adapted to slip snugly into the socket 8, the configuration of the insert as illustrated in FIG. 6 conforming closely to the inner configuration of the socket when the insert and socket are related in a flap-suspending relationship as illustrated in FIGS. 1 and 2. In this regard, note that the flanges 51 and 52 lie caught within the flanges 26–27 and 39–41, while the main central body portion of the insert projects between the adjacent edges of the flanges.

Referring to FIG. 9, it will there be seen that when the flap 2 is subjected to a downwardly directed force of sufficient amount, this being calibrated to be at least fifty pounds of force on the flap, since the flap and insert are immovably bound together either by being vulcanized, as previously explained, or by the cap screw 64, the downward force on the flap will cause the insert to slide downwardly through the socket, the converging surface 23 and 24 of the socket, working as camming surfaces against the converging surfaces 61 and 62 of the insert, so that as the insert is drawn into and through the socket, as illustrated in FIG. 9, the narrowing throat of the channels 42 and 43 constrict or compress the compression members 53 and 54, forcing them closer together, until such time as the surfaces 56 and 57 are substantially parallel to each other as indicated in FIG. 9. Continued downward displacement of the flap by an inordinate force, say a force above fifty pounds, will cause the insert, including the compression arms, to be pulled completely through the laterally spaced parallel channels 42 and 43, and out of the socket, thus releasing the flap from the socket and its mounting 13 prior to sufficient force being exerted on the flap to damage or destroy the flap by stripping the flap from the cap screws 64. As soon as the flap has been pulled free of its mounting, the inherent elasticity of the compression arms 53 and 54 causes these arms to again spread out into a divergent bifurcated pattern as illustrated in FIGS. 6 and 8. When the driver discovers that he has pulled one of his flaps free from the vehicle, all that is required is that he recover the flap, re-insert the inserts in the appropriate sockets 8 and give a slight tug downwardly so as to seat the inserts in the sockets. To lock the inserts 7 within the sockets 8, the lugs 44 and 46 may be bent over and inwardly as illustrated in FIG. 9, thus preventing the flap from being easily elevated, thus making it more difficult to steal a flap or set of flaps. With the lugs 44 and 46 bent inwardly as illustrated in FIG. 9, they form an abutment against which the top surfaces 58 of the inserts impinge if it is attempted to withdrawn the inserts from the sockets after they are inserted. I have found that in practice, these lugs 44 and 46 may be bent inwardly at the factory at the time the socket is formed, and that there is sufficient resilience and elasticity in the compression arms 53 and 54 that they will elastically flex inwardly sufficiently to clear the lugs 44 and 46 when the insert is inserted into the socket but are very difficult to compress inwardly in order to reverse the process, thus discouraging theft of the flaps.

Having thus described the invention, what is believed to be new and novel and sought to be protected by letters patent of the United States is as follows.

I claim:

1. In combination:
   (a) a vehicle having a set of rear wheels;
   (b) a set of mud flaps suspended on said vehicle behind said set of rear wheels; and
   (c) suspension means interposed between each said flap of said set of flaps and said vehicle whereby said flaps are normally retained suspended from said vehicle in operative position behind said wheels;
   (d) said suspension means including at least one non-resilient socket having open top and bottom ends and attached to said vehicle and a complementary elastically compressible non-metallic insert attached to said flap and adapted to be releasably engaged with said socket by insertion into the open top thereof to normally retain the flap suspended in operative position and release the flap without damage by elastic compression of said insert and withdrawal thereof through the open bottom of the socket when more than a predetermined downwardly directed force is imposed on said flap said socket including a pair of convergent channels, and said insert including a pair of laterally spaced convergent compression members normally complementary to and seated in said convergent channels, whereby when a downwardly directed force exceeding a predetermined amount is imposed on said flap, said insert is displaced longitudinally in relation to said flap, said insert is displaced longitudinally in relation to said socket to thereby release said insert and the attached flap from the socket.

2. The combination according to claim 1, in which said compression members are displaced inwardly toward each other by said convergent channels to diminish their lateral dimension when said insert is displaced longitudinally in relation to said socket, to thereby rearrange the compression members in a parallel relationship during the remainder of the longitudinal displacement of the insert in relation to the socket.

3. The combination according to claim 1, in which said socket is fabricated from metal, and said insert is fabricated from a non-metallic material having a durometer rating of at least 60.

4. The combination according to claim 1, in which said suspension means includes at least two laterally spaced sockets attached to said vehicle in association with each wheel, and at least two similarly spaced inserts attached to each flap and adapted to be releasably engaged with said sockets.

5. Suspension means for use in suspending a mud flap on a vehicle in association with the rear wheels thereof in such a manner that the mud flap will be released from the vehicle without damage to the flap or the suspension means upon the imposition of an inordinate and extraordinary downwardly directed force on the flap, such as might occur if the flap is caught between the wheel and an obstruction when the vehicle is backing, comprising:
   (a) a now resilient socket member having open top and bottom ends adapted to be attached to said vehicle in association with a wheel thereof, said socket member including a pair of convergent channels; and
   (b) an elastically compressible non-metallic insert member adapted for attachment to a flap and to slidably engage the socket member and including a pair of convergent compression members normally seated in said convergent channels when said socket and insert are related in flap-suspending position.

6. The suspension means according to claim 5, in which said convergent channels of said socket member include wall members constituting convergent cam surfaces, and said convergent compression members of said insert slidably engage said convergent cam surfaces when said socket and insert are related in flap-suspending position.

7. The suspension means according to claim 6, in which an inordinate and extraordinary force on the insert imposed relative to the socket in the direction of convergence of said channels and said convergent compression members effects longitudinal displacement of the insert in relation to the socket, and said longitudinal displacement of the insert effects a camming action by the convergent cam surfaces of the socket on the convergent compression members whereby said convergent compression members are displaced laterally to enable said compression members to be pulled free from said socket channels.

8. The suspension means according to claim 7, in which means are provided on said socket for attaching the socket to a vehicle.

9. The suspension means according to claim 7, in which means are provided on said insert for attaching the insert to a flap.

10. The suspension means according to claim 7, in which said socket is provided with a pair of spaced parallel channels arranged in association with said convergent channels, a portion of said insert is engaged by said parallel channels when said convergent compression members are engaged in said convergent channels, whereby longitudinal displacement of said insert in relation to said socket is guided by said parallel channels, and said convergent compression members of said insert when displaced laterally by said camming surfaces of said convergent channels are engaged while in said laterally displaced condition by said parallel channels when said insert is displaced longitudinally to release said compression members from said convergent channels.

11. The suspension means according to claim 10, in which said socket is metal, and said convergent compression members are resiliently deformable.

12. The method of releasably suspending a flexible mud flap on a vehicle behind a wheel thereof so that the mud flap normally hangs in position to intercept debris thrown backwardly by the wheel when the vehicle is moving forwardly but is released undamaged from the vehicle when caught between a rearwardly moving wheel and an obstruction such as a concrete parking bumper, comprising:

(a) attaching at least one non-resilient mud flap supporting bracket having laterally spaced and downwardly convergent cam surfaces on the vehicle in close proximity above and behind the wheel;

(b) attaching to the mud flap at least one flexibly resilient insert member including laterally spaced elastically displaceable convergent extensions having laterally spaced convergent surfaces correlated to said convergent cam surfaces; and (c) suspending the mud flap from the vehicle by inserting the flexibly resilient insert member into said non-resilient supporting bracket from above until the lateral surfaces of the elastically displaceable convergent extensions of the insert member are juxtaposed contiguously to the laterally spaced and convergent cam surfaces of the non-resilient supporting bracket, whereby the mud flap is releasably retained suspended in sufficiently close proximity to the wheel so that debris thrown backward by the wheel will be intercepted by the mud flap and so that the lower edge thereof is in sufficiently close proximity to the surface on which the wheel rotates that forward flexure of the mud flap by an obstruction of sufficient height to press the mud flap against the rearwardly rotating wheel causes the wheel to exert a downwardly directed force on the mud flap sufficient to cause the elastically displaceable convergent extensions of the flexibly resilient insert member to be elastically displaced into a parallel relationship as the insert member is drawn downwardly through and free from the non-resilient supporting bracket to thereby non-destructively release the mud flap from the vehicle.

* * * * *